Patented Jan. 29, 1929.

1,700,627

UNITED STATES PATENT OFFICE.

SAMUEL WARREN COLE, OF TULSA, OKLAHOMA.

PROCESS FOR RECOVERING OILS FROM EMULSIONS.

No Drawing.    Application filed December 17, 1924.   Serial No. 756,565.

This invention relates to a process for treating natural crude petroleum emulsions for the purpose of dehydrating the same and reclaiming merchantable crude petroleum.

An object of the invention is the provision of a process in which a chemical is employed which is adapted to release a small fraction of the water surrounding minute globules of oil or the water contained in a film of oil so that the elements of the emulsion are broken down, whence the remainder of the water and oil will separate into strata.

A further object of the invention is the provision of a process in which emulsion is treated with suitable chemicals or chemical compounds with or without the aid of heat, whereby the chemical will become thoroughly mixed with the emulsion and combine with the water, and at the same time generating heat which reduces the viscosity of the oil and materially aids in the precipitation of the water.

This invention will be best understood from a consideration of the following detailed description; nevertheless it is to be understood that the invention is not confined to the disclosure, being susceptible of such changes and modifications which shall define no material departure from the salient features of the invention as expressed in the appended claim.

Frequently crude petroleum as it is produced in the wells is not marketable, due to its containing a higher percentage of a watery emulsion and other foreign matter than is acceptable to the pipe line companies. Such oils are commonly known as "roily oil" or "cut oil." In some cases the emulsions and other foreign matter contained in the oil will settle to the bottom of the tank, when stored for a long period of time, and forming at the bottom of the tank a viscous, yellow or brown mixture commonly known as "bottom settlings", "basic sediment" or "B. S." This liquid known as "bottom settlings" is the same substance suspended in the cut or roily oil and will sometimes remain in suspension for a number of years and contain from 10 to 90 per cent of merchantable pipe line oil.

In carrying out my invention I thoroughly mix throughout the entire body of the oil to be treated suitable chemicals or chemical compounds, such as calcium carbide and metallic sodium or a combination of both. This mixing is accomplished by agitating the chemicals and oil in a tank by means of natural gas or compressed air as is the usual practice in oil refinery for the chemical treatment of products, or the chemical and oil may be circulated by means of a pump through pipes and tank until the mixture is complete, or any suitable means may be employed for introducing the chemicals in the pipe line in proper proportions near the well from which the roily oil is produced, so that the chemical will be thoroughly mixed with the oil flowing through the pipe line before it reaches the storage tank. Then the oil thus treated is permitted to stand say for a period of from three to twenty-four hours, whence the oil and water will separate into respective strata.

Calcium carbide and sodium have a great affinity for water, but do not act on the oil, therefore when either the carbide or sodium are thoroughly mixed with the emulsion, it will break down the film of oil around the micro globules of water or the film of water around the micro globules of oil, and thereby liberate the remaining portions of water, permitting it to settle with other foreign matter to the bottom of the tank, and allowing the clean oil to rise to the top and float on a strata of the water, whence it may be drawn off, or the water may be drawn off beneath the oil, leaving the clean oil therein and from which the oil may be pumped to the storage tank.

If the oil is viscous or cold, it is often advantageous to apply heat by some such means as steam coils placed in the bottom of the tank, or by circulating the oil through a heat exchanger or through a boiler. However, the degree of heat should not be such that the lighter hydro-carbons are distilled off. When calcium carbide or sodium acts upon the water, gases are produced which, upon being absorbed by the oil, reduces the viscosity and lightens the gravity of the oil, and will thereby materially aid in the separation of the oil and water, allowing the oil to rise and float upon the water. The gas thus generated passing through the emulsion will aid in agitating the emulsion and greatly increase the speed of reduction of said emulsion.

Chemicals may be employed, which, being intimately mixed with the roily oil or bottom settlings will act as a solvent for the colloidal matter and break down the emulsion forming a lower stratum of water and an upper stratum of oil. A number of chemicals will have this effect, such as carbon bisulphide and carbon tetrachloride.

Carbon black or powdered charcoal, when intimately mixed with such emulsion, are effective for causing the emulsion to separate into its component parts for causing the relatively heavier constituents to precipitate to the bottom of the tank, forming a lower stratum of water and other impurities and an upper stratum of clean oil.

Certain chemicals, such as calcium carbide, when mixed with a mineral emulsion, generate heat, which reduces the viscosity of the oil, thereby aiding the precipitation of the water.

While I have not stated definite quantities of the various constituents employed for breaking down the emulsion, it must be borne in mind that while one chemical or a mixture of the chemicals may be very effective for one form of emulsion, an entirely different chemical or mixture of chemicals will be more effective for another form of emulsion.

What I claim is:

A process for breaking up crude petroleum emulsions comprising thoroughly mixing metallic sodium and calcium carbide with the emulsion to cause a chemical reaction between the water of the emulsion and the metallic sodium and calcium carbide, whereby the emulsion is broken down and the water and oil separated into strata.

SAMUEL WARREN COLE.